United States Patent [19]
Norton et al.

[11] 3,825,069
[45] July 23, 1974

[54] CARBOXY VINYL POLYMER AND PARTIALLY HYDROLYZED POLYACRYLAMIDE MOBILITY CONTROL AGENT AND PROCESS

[75] Inventors: Charles J. Norton; David O. Falk, both of Denver, Colo.

[73] Assignee: Marathon Oil Company, Findlay, Ohio

[22] Filed: Mar. 27, 1972

[21] Appl. No.: 238,143

[52] U.S. Cl............ 166/305 R, 166/275, 252/8.55 D
[51] Int. Cl.............................................. E21b 43/16
[58] Field of Search............................ 166/273–275, 166/305 R; 252/8.55 D, 89

[56] References Cited
UNITED STATES PATENTS

| | | |
|---|---|---|
| 2,798,053 | 7/1957 | Brown................................ 252/89 X |
| 3,308,885 | 3/1967 | Sandiford..................... 166/305 R X |
| 3,402,137 | 9/1968 | Fischer et al. ................... 166/305 R |
| 3,543,855 | 12/1970 | Blatz et al........................ 166/275 X |
| 3,634,305 | 1/1972 | Johnson et al.................. 166/274 X |
| 3,679,000 | 7/1972 | Kaufman........................... 166/275 X |
| 3,684,014 | 8/1972 | Norton et al. ........................ 166/275 |
| 3,687,199 | 8/1972 | Jennings ............................. 166/274 |

*Primary Examiner*—Stephen J. Novosad
*Assistant Examiner*—Jack E. Ebel
*Attorney, Agent, or Firm*—Joseph C. Herring; Richard C. Willson, Jr.; Jack L. Hummel

[57] ABSTRACT

Carboxy vinyl polymer (e.g., Carbopol 961) when dissolved with partially hydrolyzed polyacrylamide (e.g., Dow 700) increases screen factor and provides enhanced supplemented recovery of oil.

11 Claims, 2 Drawing Figures

3,825,069

CARBOXY VINYL POLYMER AND PARTIALLY HYDROLYZED POLYACRYLAMIDE MOBILITY CONTROL AGENT AND PROCESS

CROSS REFERENCES TO RELATED APPLICATIONS

The following cases relate to the same general field as that of the present invention:
U.S. Pat. No. 3,507,331;
U.S. Pat. No. 3,467,187;
S/N 74,336 filed Sept. 22, 1970 now U.S. Pat. No. 3,677,344;
S/N 76,140 filed Sept. 28, 1970 now U.S. Pat. No. 3,724,545;
S/N 67,726 filed Aug. 28, 1970 now U.S. Pat. No. 3,670,820;
S/N 79,591 filed Oct. 9, 1970 now U.S. Pat. No. 3,692,113;
S/N 85,064 filed Oct. 29, 1970 now U.S. Pat. No. 3,684,014;
S/N 126,731 filed Mar. 22, 1971;
S/N 133,060 filed Apr. 12, 1971;
S/N 140,931 filed May 6, 1971;
S/N 209,479 filed Nov. 26, 1971;
S/N 238,142 filed Mar. 27, 1972;
S/N 220,910 filed Jan. 26, 1972; and

BACKGROUND OF THE INVENTION

1. Field of the Invention

The present invention relates primarily to wells classified in Class 166 of the U.S. Pat. Office, and more particularly to production of earth fluid by driving fluid classified in Class 166 subclass 252.

2. Description of the Prior Art

Water flooding with mobility-reducing agents, e.g., high molecular weight partially hydrolyzed polyacrylamides, such as Dow Chemical Company "700," has been successfully used to recover increased amounts of oil in secondary recovery methods. U.S. Pat. No. 2,827,964, teaches secondary recovery of petroleum from subterranean formations using water-soluble partially hydrolyzed acrylamide polymer. U.S. Patent application Ser. No. 76,140, filed Sept. 28, 1970 (Docket No. 690087-A-USA), copending, teaches improved mobility control of petroleum recovery by injecting at least two slugs, one containing a permeability reduction agent, e.g., partially hydrolyzed, high molecular weight polyacrylamide, and the other slug containing a fluid viscosity-increasing agent, e.g., a linear polysaccharide or other bipolymer.

Carboxy vinyl polymers (CVP), e.g., B. F. Goodrich Chemical Company's Carbopol, (described in their Service Bulletin GC-36) have been used as viscosity-increasing agents in secondary recovery operations. However, the present invention embodies the discovery that a combination of two agents provides unexpected increase in the efficiency of petroleum recovery, substantially above that which would be expected from an examination of data on the use of either of the polymers alone. The prior art discussed in the aforementioned related applications also has applicability to the general field of the present invention.

A design criterion for an optimum flooding process is to have the mobility of the displacing fluid about equal to or less than that of the combination of the formation fluids (hydrocarbon and interstitial water) within the reservoir. This has usually been accomplished by injecting into the water flood a single agent to effect a reduction in mobility. Most commonly, this agent is a partially hydrolyzed, high molecular weight polyacrylamide.

SUMMARY OF THE INVENTION

This invention relates to a method of improving mobility control of a flooding process by injecting an aqueous solution of CVP and partially hydrolyzed polyacrylamide into the oil bearing formation. The result of the injection of this aqueous solution is a substantial increase in the screen factor property and also the production of petroleum from subterranean formations.

DESCRIPTION OF THE PREFERRED EMBODIMENTS

Starting Materials:

By "carboxy vinyl polymer" is meant herein high molecular weight polymers containing predominantly carboxy vinyl monomer units.

By "partially hydrolyzed polyacrylamide" is meant herein polyacrylamide which has been hydrolyzed to 0.1 to 70 percent, more preferably to 1 to 45 percent, most preferably 5 to 30 percent, of theory.

Partially hydrolyzed polyacrylamide will preferably have molecular weights in the range above $0.1 \times 10^6$, preferably from $0.5$ to $40 \times 10^6$, more preferably from $1 \times 10^6$ to $15 \times 10^6$, and most preferably from $3 \times 10^6$ to $10 \times 10^6$. Preferably the partially hydrolyzed polyacrylamide will be present in amounts of from about 0.001 to about 10.0, more preferably from 0.01 to about 1.0, and most preferably from 0.02 to about 0.2 weight percent based on the weight of the total solution.

The carboxy vinyl polymer (CVP) will preferably have a molecular weight above $0.1 \times 10^6$, preferably 0.5 to about $20 \times 10^6$, more preferably from 1 to about $15 \times 10^6$, and most preferably from $3 \times 10^6$ to about $10 \times 10^6$.

Preferably, the CVP will be present in amounts from about 0.001 to about 10, more preferably from 0.01 to about 1.0, and most preferably from 0.02 to about 0.2 weight percent based on the total solution.

The solvent for the liquid solutions of the present invention are comprised of water, most preferably consist essentially of connate water, for example, Palestine line water, fresh water, or brackish water. It is preferable that the water contain less than about 300,000, more preferably less than about 10,000, and most preferably less than about 500 parts per million of dissolved solids. The resulting aqueous solution of CVP and partially hydrolyzed polyacrylamide will preferably have viscosity of from about 1.5 to about 1,000 cps, more preferably from about 5 to about 500 cps, and most preferably from 10 to about 100 cps.

Figure 1:
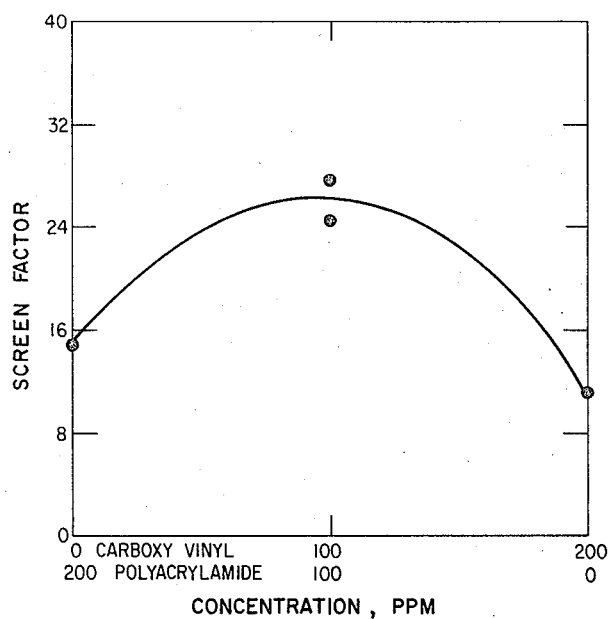
FIG. 1 shows the unexpected synergistic improvement in screen factor obtained with a thickener formulation comprised of 50 percent CVP and 50 percent partially hydrolyzed polyacrylamide (Dow 700).

While not necessary to the practice of the present invention, various other ingredients including among others, cellulose derivatives and surfactants, e.g., polyalkyl aryl sulfonate and other conventional displacement fluid additives may be added to the liquid polymer solutions. Preparation of Liquid Systems: It will generally be preferable to merely co-mix CVP and the partially hydrolyzed polyacrylamide and then add water while gently stirring to promote dispersion, suspension, and solution. Bubbling a small amount of non-reactive gas, e.g., natural gas, may be used to effect mild stirring. The ingredients will preferably be mixed at ambient temperature, more preferably from 0°C. to about 100°C., and most preferably from 20°C. to about 50°C. If desired, a mixing operation can be employed in one or more full-type mixers or mixing tees so long as the proportions of the ingredients are properly measured and thoroughly mixed. Bacteriocides and antioxidants can be advantageously added to preserve the viscosity of the solution. Screen Factor: Aqueous solutions of CVP and partially hydrolyzed polyacrylamide are prepared by weighing both solids into a bottle, adding deionized water, stirring slowly with a magnetic bar for several hours until visibly dissolved, and then allowing to stand for one day. Testing for "screen factor" is done according to Society of Petroleum Engineers Paper No. 2867, and the test results are summarized in FIG. 1.

Carbopol CVP 961 was used in applicants' Examples I–IV.

Examples:

EXAMPLES I-IV

Examples I through IV are run under identical conditions.

A 3 inch diameter by 4 foot Berea sandstone cylindrical core is prepared to simulate a condition at the termination of a preliminary secondary water-flood operation. This condition is achieved by first saturating the core with artificial Henry field water, then partially displacing this water with Henry field crude oil until saturated with crude ($O_i$, $W_i$), and finally water flooding with artificial Henry water to residual oil ($O_r$) and residual water ($W_r$) saturations.

The comparabilities of the examples employing various thickeners in supplemented recovery operations are established by the preliminary data on pore volumes (PV), porosities, permeabilities (md), initial oil and water saturations ($O_i$, $W_i$) residual oil and water saturations ($O_r$ and $W_r$) after preparation simulated water flood with a typical Henry field plant water, and similar efficiencies of water flood recovery (Eff).

In all experiments supplemental floods a 0.03 PV slug of a petroleum sulfonate (FF-561) was pushed in the secondary flooding operation by up to about 1 PV of the particular thickened water. In each example the injection of thickened water was continued to the point at which no additional oil was recovered. The data are summarized in Table 1, the last column of which lists the percent oil recovery based on residual oil remaining after the preliminary water flood.

Figure 2:
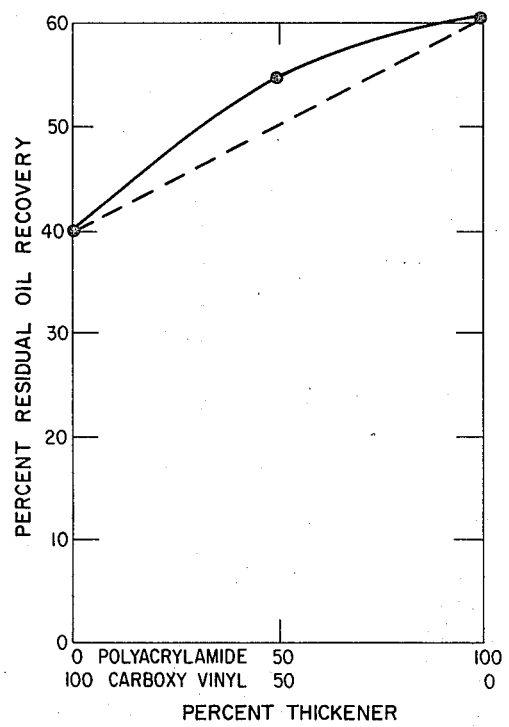
FIG. 2 compares the supplemented oil recoveries obtained at various compositions of thickener, all used at 500 ppm concentration and used to push a 0.03 pore volume of surfactant slug. The magnitude of the synergism attained with up to 50 percent partially hydrolyzed polyacrylamide (PHPA) with CVP is indicated by the area between the two curves.

The synergistic effect of thickened water prepared from mixed compositions of partially hydrolyzed polyacrylamide and CVP are illustrated on FIG. 2.

Table 1

SUMMARY OF THICKENED WATER SUPPLEMENTED RECOVERIES[1]

| Example Number | Run Number | PV, cc | Porosity, % | Permeability md | $O_i$ % | $W_i$ % | $O_r$ % | $W_r$ % | Eff. % | Thickener | Total Thickened Water Recovery PV | % of $O_r$ |
|---|---|---|---|---|---|---|---|---|---|---|---|---|
| 1 | 06118 | 1038 | 20.2 | 628.0 | 63.8 | 36.2 | 38.4 | 61.6 | 39.8 | 500 ppm partially hydrolyzed polyacrylamide | 0.957 | 60.8 |
| 2 | 07101 | 1031 | 20.0 | 557.2 | 62.3 | 37.7 | 38.9 | 61.1 | 37.6 | 500 ppm partially hydrolyzed polyacrylamide | 0.968 | 60.9 |
| 3 | 09140 | 1083 | 21.0 | 680.1 | 63.9 | 36.1 | 40.4 | 59.6 | 36.8 | 250 ppm partially hydrolyzed polyacrylamide 250 ppm carboxyvinyl polymer | 1.02 | 53.9 |
| 4 | 09137 | 1092 | 21.2 | 780.4 | 62.5 | 37.5 | 36.3 | 63.7 | 41.9 | 500 ppm carboxy vinyl polymer | 1.02 | 39.5 |

[1] 3 in. diameter by 4 ft. long Berea sandstone (fired at 825°F.) was first saturated with artificial Henry plant brine (containing 11,000 ppm $Cl^-$, 6500 ppm $Na^+$, 276 ppm $Ca^{++}$, 167 ppm $Mg^{++}$) and Henry Crude to an initial oil saturation ($O_i$) and initial water saturation ($W_i$); the core was subsequently flooded to residual saturation ($O_r$ and $W_r$) and then flooded at rates of 1.9 to 3.7 ft/day with 0.03 PV of FF-561 slug (petroleum sulfonate slug) followed by up to 1 pore volume of synthetic "Palestine Water" (containing 400 ppm NaCl and 55 ppm $CaCl_2$) and the additional crude recovered and calculated as percent of residual oil in the core before this final flood.

MODIFICATIONS OF THE INVENTION

It will be understood by those skilled in the art that the relative proportions of the admixture of CVP and partially hydrolyzed polyacrylamides utilized in the examples herein are merely exemplary of the relative proportions which may be employed with the present invention. For example, using nearly 100% CVP at the leading edge of the displacement slug and gradually using a higher and higher percentage of partially hydrolyzed polyacrylamides, to provide a slug which is rich at its leading edge where depletion is most likely to occur. Initial viscosity of the slug may be the same at all points throughout the slug or may be itself gradually decreased until it approaches that of the drive fluid which displaces the slug through the formation.

What is claimed is:

1. A process for the displacement of oil in an oil-bearing formation comprising injecting into said formation an aqueous solution comprised of about 0.001 to about 10 percent by weight of a water-soluble partially hydrolyzed polyacrylamide and about 0.001 to about 10 weight percent water-soluble carboxy vinyl polymer based on the weight of the total solution.

2. Processes according to claim 1 wherein the partially hydrolyzed polyacrylamide polymer has a molecular weight above 100,000 prior to comixing with said carboxy vinyl polymer.

3. Processes according to claim 1 wherein the partially hydrolyzed polyacrylamide has a molecular weight of from about 500,000 to about 20,000,000 and is hydrolyzed to from about 0.1 to about 70 percent of theory.

4. Processes according to claim 1 wherein the partially hydrolyzed polymer is present in a concentration of from about 0.01 to about 1.0 percent by weight based on the weight of the total solution.

5. A process according to claim 1 wherein the aqueous solution is characterized by a viscosity of from about 1.5 to about 1,000 centipoises.

6. A process according to claim 5 wherein the aqueous solution is characterized by a viscosity of from about 5 to about 500 centipoises.

7. A process according to claim 5 wherein the aqueous solution is characterized by a viscosity of from about 10 to about 100 centipoises.

8. Processes according to claim 1 wherein the carboxy vinyl polymer has a molecular weight above 100,000.

9. Processes according to claim 1 wherein the carboxy vinyl polymer has a molecular weight in the range of from about 500,000 to about 20,000,000.

10. Processes according to claim 1 wherein the carboxy vinyl polymer is present in a concentration of from about 0.01 to about 1.0 percent by weight based on the weight of the total solution.

11. Processes according to claim 1 wherein the partially hydrolyzed polyacrylamide polymer is hydrolyzed from about 0.1 to about 70 percent.

* * * * *